United States Patent
Ohta et al.

(10) Patent No.: US 12,017,580 B2
(45) Date of Patent: Jun. 25, 2024

(54) LIGHTING CIRCUIT AND VEHICULAR DIRECTION INDICATOR LAMP

(71) Applicant: KOITO MANUFACTURING CO., LTD., Tokyo (JP)

(72) Inventors: Shinji Ohta, Shizuoka (JP); Susumu Ogo, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 115 days.

(21) Appl. No.: 17/793,098

(22) PCT Filed: Jan. 13, 2021

(86) PCT No.: PCT/JP2021/000884
§ 371 (c)(1),
(2) Date: Jul. 15, 2022

(87) PCT Pub. No.: WO2021/149561
PCT Pub. Date: Jul. 29, 2021

(65) Prior Publication Data
US 2023/0045032 A1 Feb. 9, 2023

(30) Foreign Application Priority Data

Jan. 20, 2020 (JP) ................................ 2020-006662
Jul. 2, 2020 (JP) ................................ 2020-114844

(51) Int. Cl.
*H05B 47/155* (2020.01)
*B60Q 1/38* (2006.01)
(Continued)

(52) U.S. Cl.
CPC ............... *B60Q 1/381* (2022.05); *B60Q 1/40* (2013.01); *H05B 47/155* (2020.01)

(58) Field of Classification Search
CPC ..................................................... B60Q 1/381
See application file for complete search history.

(56) References Cited

U.S. PATENT DOCUMENTS

2006/0255749 A1* 11/2006 Glassner ................ H05B 45/10
  315/291
2008/0197789 A1   8/2008 Shiotsu et al.
(Continued)

FOREIGN PATENT DOCUMENTS

DE   102015201739 A1 *  8/2015  ............... B60Q 1/34
DE   102015201739 A1    8/2015
(Continued)

OTHER PUBLICATIONS

International Search Report (PCT/ISA/210) issued Feb. 16, 2021 by the International Searching Authority in counterpart International Application No. PCT/JP2021/000884.
(Continued)

*Primary Examiner* — Joseph H Feild
*Assistant Examiner* — Pameshanand Mahase
(74) *Attorney, Agent, or Firm* — Sughrue Mion, PLLC

(57) ABSTRACT

A linear regulator supplies a first drive current to a first light source in a first period in which the first light source is turned on and a second light source is not turned on, and in a second period in which the first light source and the second light source are turned on, and stops the supply of the first drive current in a third period in which the first light source and the second light source are turned off. A switching regulator supplies a second drive current to the second light source in the second period, and stops the supply of the second drive current in the third period.

10 Claims, 7 Drawing Sheets

(51) Int. Cl.
*B60Q 1/40* (2006.01)
*H05B 45/37* (2020.01)
*H05B 45/48* (2020.01)

(56) References Cited

U.S. PATENT DOCUMENTS

| | | | |
|---|---|---|---|
| 2015/0102723 A1 | 4/2015 | Krick et al. | |
| 2017/0182941 A1* | 6/2017 | Ohta | H05B 45/52 |
| 2018/0054862 A1* | 2/2018 | Takagimoto | H05B 47/20 |
| 2018/0063918 A1* | 3/2018 | Nakamura | H05B 45/48 |

FOREIGN PATENT DOCUMENTS

| | | |
|---|---|---|
| JP | 2008-198915 A | 8/2008 |
| JP | 2017-119449 A | 7/2017 |
| JP | 2019-1311 A | 1/2019 |

OTHER PUBLICATIONS

Written Opinion (PCT/ISA/237) issued Feb. 16, 2021 by the International Searching Authority in counterpart International Application No. PCT/JP2021/000884.

Extended European Search Report dated Jun. 9, 2023, issued by European Patent Office in European Patent Application No. 21743642.7.

* cited by examiner

LIGHTING CIRCUIT AND VEHICULAR DIRECTION INDICATOR LAMP

TECHNICAL FIELD

The present disclosure relates to a lighting circuit and a vehicular side turn signal lamp.

BACKGROUND ART

A vehicular side turn signal lamp (hereinafter, referred to as "turn signal lamp") uses a so-called sequential technique in which a plurality of light sources are sequentially turned on (for example, see Patent Literature 1).

CITATION LIST

Patent Literature

Patent Literature 1: JP-A-2017-119449

SUMMARY OF INVENTION

Technical Problem

When the sequential turn signal lamp is used, there is a timing at which a lighting circuit turns on only a part of the light sources among the plurality of light sources. At such a timing, since power consumed by the turn signal lamp is small, a current (hereinafter, referred to as "input current") supplied from a power supply on a vehicle side to the turn signal lamp is also reduced.

Therefore, in a case where a detection device that detects that the light sources are disconnected when the input current becomes smaller than a predetermined value is provided in a vehicle, the detection device may erroneously detect that the light sources are disconnected, for example, at a timing at which only the part of the light sources are turned on.

It is required to provide a lighting circuit capable of preventing a light source of a turn signal lamp from being erroneously detected as being disconnected.

Solution to Problem

In order to meet the above requirements, according to one aspect of the present disclosure, there is provided a lighting circuit applied to a vehicular side turn signal lamp that makes a first light source including at least one light emitting element and a second light source including at least one light emitting element blink, the lighting circuit including:
  a first regulator configured to supply a predetermined first drive current to the first light source based on power from a power supply line in a first period in which the first light source is turned on and the second light source is not turned on and a second period in which the first and second light sources are turned on, and stop the supply of the first drive current to the first light source in a third period in which the first and second light sources are turned off;
  a second regulator having higher power conversion efficiency than the first regulator, and configured to supply a predetermined second drive current to the second light source based on the power from the power supply line in the second period, and stop the supply of the second drive current to the second light source in the third period; and
  a control circuit configured to repeatedly control the second regulator in a predetermined cycle including the first to third periods.

In order to meet the above requirements, according to one aspect of the present disclosure, there is provided a vehicular side turn signal lamp including:
  a first light source including at least one light emitting element;
  a second light source including at least one light emitting element; and
  a lighting circuit configured to make the first light source and the second light source blink,
  wherein the lighting circuit includes
    a first regulator configured to supply a predetermined first drive current to the first light source based on power from a power supply line in a first period in which the first light source is turned on and the second light source is not turned on and a second period in which the first and second light sources are turned on, and stop the supply of the first drive current to the first light source in a third period in which the first and second light sources are turned off,
    a second regulator having higher power conversion efficiency than the first regulator, and configured to supply a predetermined second drive current to the second light source based on the power from the power supply line in the second period, and stop the supply of the second drive current to the second light source in the third period, and
    a control circuit configured to repeatedly control the second regulator in a predetermined cycle including the first to third periods.

DESCRIPTION OF EMBODIMENTS

At least the following matters will become apparent from a description of the present specification and the accompanying drawings.

<<Configuration of Turn Signal Lamp 10>>

Figure 1:
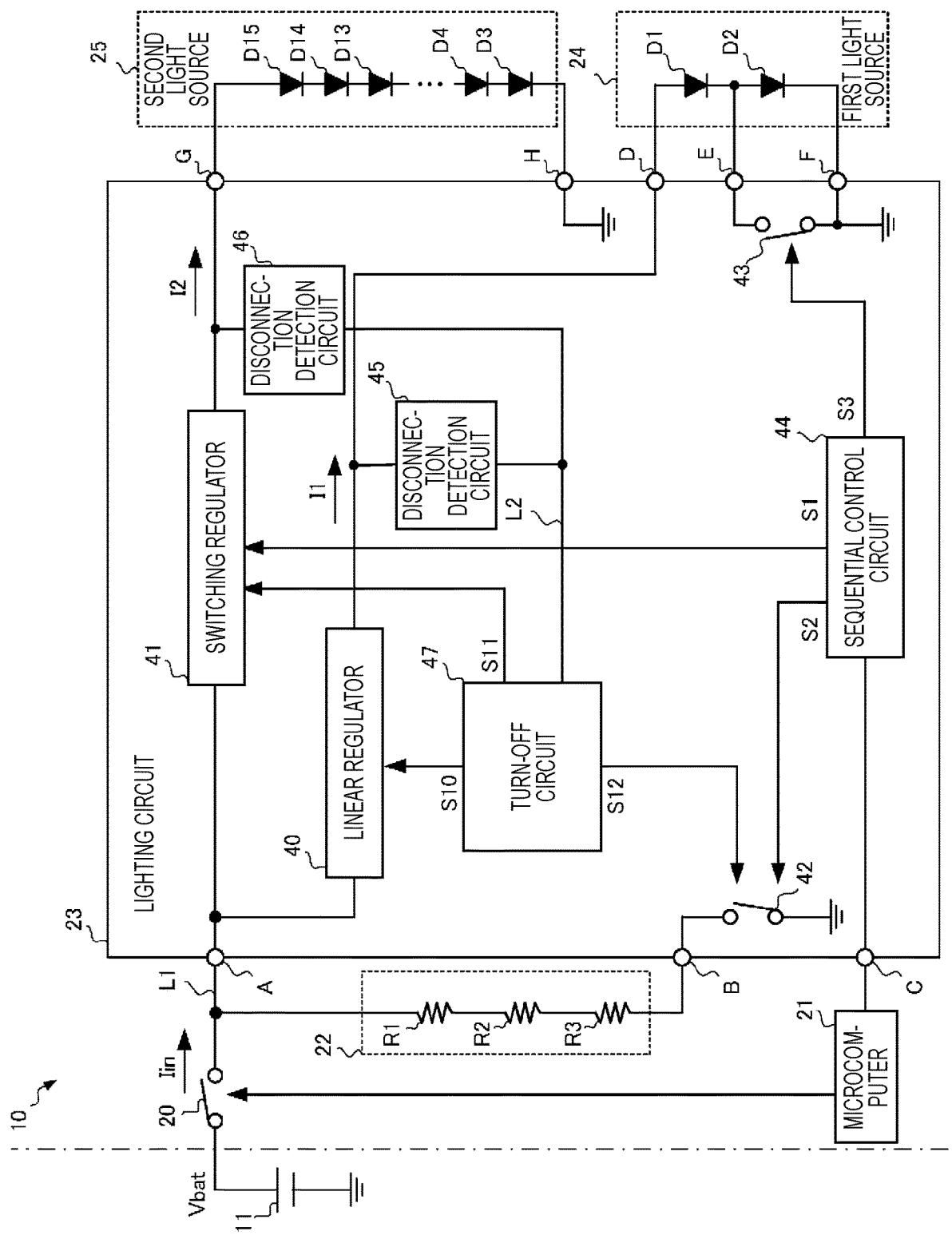
FIG. 1 is a diagram illustrating an example of a turn signal lamp.

FIG. 1 is a diagram illustrating an example of a configuration of a turn signal lamp 10 according to an embodiment of the present disclosure. The turn signal lamp 10 is a "vehicular side turn signal lamp" that sequentially turns on a plurality of light sources based on a voltage Vbat of a vehicle battery 11.

The turn signal lamp 10 includes a switch 20, a microcomputer 21, a resistance circuit 22, a lighting circuit 23, a first light source 24, and a second light source 25.

The switch 20 is an element for applying a power supply for operating the lighting circuit 23 to a power supply line L1 of the turn signal lamp 10. For example, a mechanical contact relay, a non-contact relay using a semiconductor chip, or the like is adopted as the switch 20. The voltage Vbat is applied to one end of the switch 20, and the other end of the switch 20 is connected to the power supply line L1. Therefore, when the switch 20 is turned on based on an instruction from the microcomputer 21, the voltage Vbat is applied to the power supply line L1. The power supply line L1 is a wiring that supplies power to a circuit inside the lighting circuit 23 via a terminal A (described later).

The microcomputer 21 is a circuit that controls operations of the turn signal lamp 10, and for example, when a driver of a vehicle operates a direction indicator (not illustrated) to turn on the turn signal lamp 10, the microcomputer 21 turns on and off the switch 20 at a predetermined "cycle Tx". Although details will be described later, the microcomputer 21 operates a sequential control circuit 44 (described later) provided in the lighting circuit 23 based on an operation result of the direction indicator.

The resistance circuit 22 is a circuit for adjusting a current value of an input current Iin supplied from the battery 11 to the turn signal lamp 10, and includes, for example, resistors R1 to R3 connected in series. Although the three resistors R1 to R3 are connected in series in the resistance circuit 22, a connection method and the number of resistors are not limited thereto as long as the resistance circuit 22 includes at least one resistor.

When the voltage Vbat is applied to the power supply line L1, the lighting circuit 23 sequentially turns on the first light source 24 and the second light source 25 based on an instruction from the microcomputer 21. Although details of the lighting circuit 23 will be described later, the lighting circuit 23 is a module in which a plurality of circuits for turning on light emitting elements (described later) and terminals A to G are attached to a board.

The first light source 24 is a light source including two light emitting elements, that is, a light emitting element D1 that is turned on first, and a light emitting element D2 that is turned on after the light emitting element D1. The light emitting elements D1 and D2 are connected in series between the terminal D and the terminal F, and a cathode of the light emitting element D1 and an anode of the light emitting element D2 are connected to the terminal E.

The second light source 25 is a light source including thirteen light emitting elements D3 to D15 that are turned on after the light emitting element D2 of the first light source 24 is turned on. The light emitting elements D3 to D15 are connected in series between a terminal G and a terminal H.

In the present embodiment, in order to turn on the light emitting elements D1 to D15, when a predetermined current (for example, 360 mA) is supplied to each of the light emitting elements D1 to D15, a forward voltage of the light emitting elements D1 to D15 becomes, for example, 3 V. Therefore, a voltage between the terminals D and F to which the first light source 24 is connected becomes 3 V or 6 V, and a voltage between the terminals G and H to which the second light source 25 is connected becomes 39 V.

<<Allowable Range of Input Current Iin>>

Incidentally, in the vehicle in which the turn signal lamp 10 of the present embodiment is incorporated, there is provided a detection device (not illustrated) that detects whether there is a disconnection in the light emitting element of the turn signal lamp 10 based on the input current Iin from the battery 11. For example, when the current value of the input current Iin is smaller than a "predetermined value Ix" while the turn signal lamp 10 is operating, the detection device detects that there is a disconnection in the light emitting element of the turn signal lamp 10.

Therefore, while the turn signal lamp 10 is operating in a normal state, the current value of the input current Iin needs to be larger than the "predetermined value Ix" so as not to erroneously detect that the light emitting element is disconnected. Here, the "normal state" means, for example, a state in which no disconnection occurs in the light emitting elements of the first light source 24 and the second light source 25 of the turn signal lamp 10. The "disconnection of the light emitting elements" means, for example, a state in which a resistance value between a cathode and an anode of the light emitting element is sufficiently larger than a normal resistance value.

On the other hand, when power consumption of the turn signal lamp 10 becomes larger than necessary, since the input current Iin to the turn signal lamp 10 also increases, the current from the battery 11 may exceed, for example, a rated current.

Figure 2:
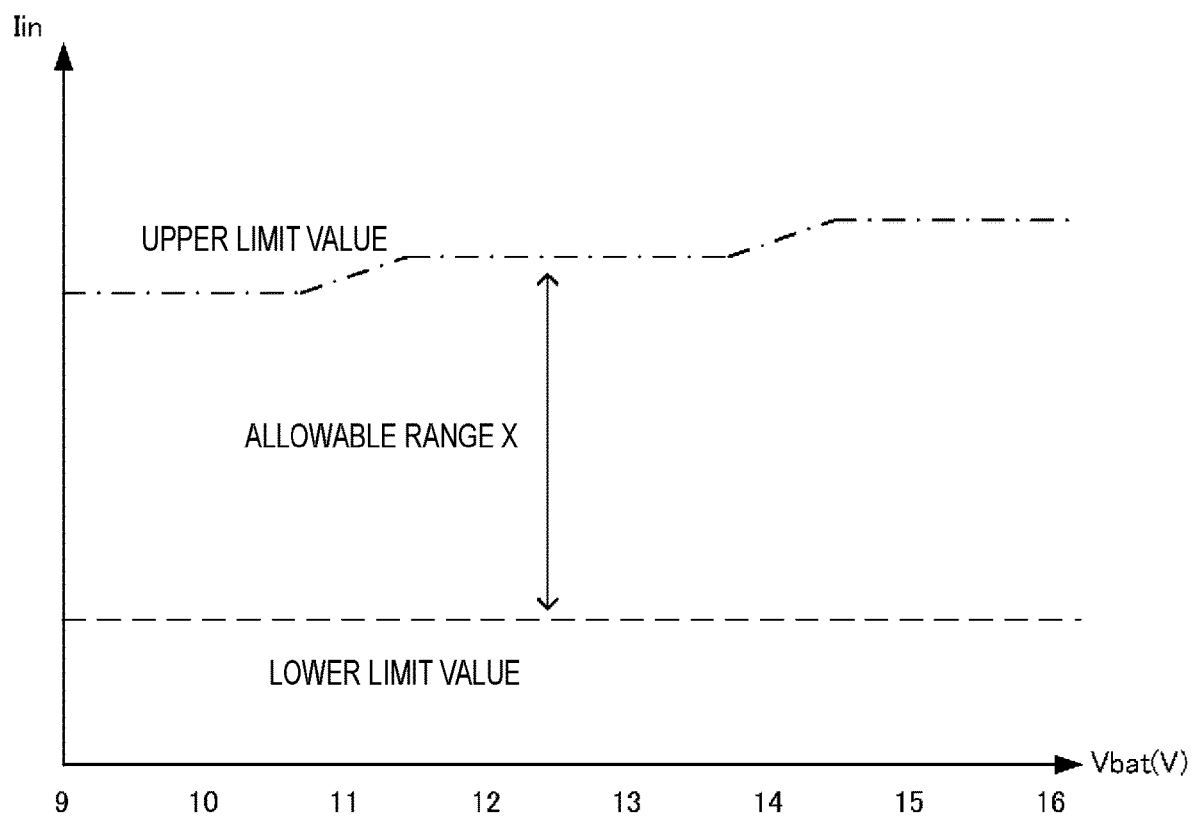
FIG. 2 is a diagram illustrating an example of an allowable range of an input current to the turn signal lamp.
Figure 3:
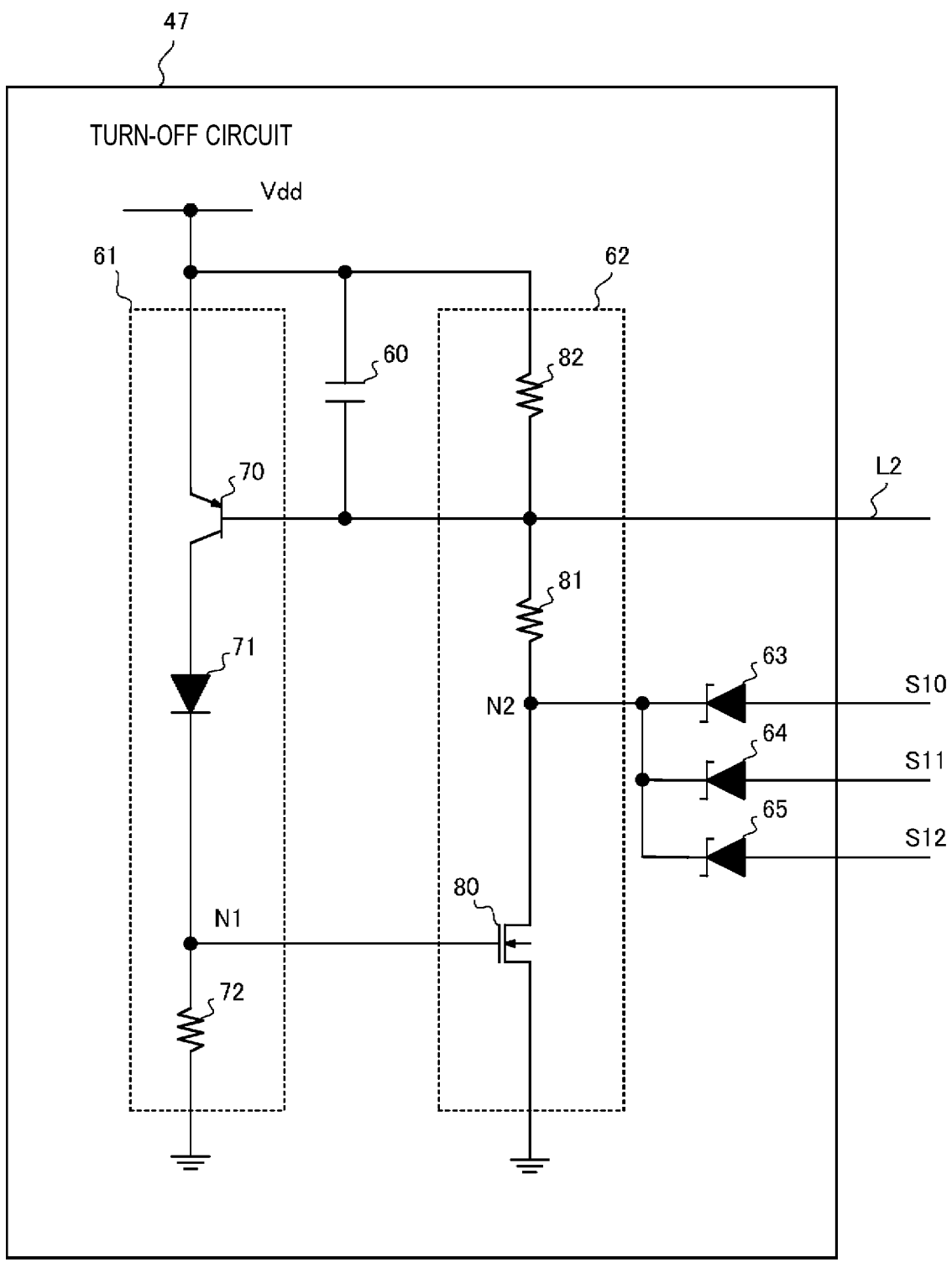
FIG. 3 is a diagram illustrating an example of a turn-off circuit.

Therefore, while the turn signal lamp 10 is operating, the input current Iin flowing from the battery 11 to the turn signal lamp 10 needs to fall within, for example, an "allowable range X" illustrated in FIG. 2.

Here, the "allowable range X" is, for example, a range between a "lower limit value" indicated by a dotted line and an "upper limit value" indicated by an alternate long and short dash line when the voltage Vbat of the battery 11 changes, for example, from 9 to 16 V. The "lower limit value" is, for example, a value larger than the "predetermined value Ix" when it is detected whether there is a disconnection in the light sources of the turn signal lamp 10. The "upper limit value" is, for example, a value determined based on a capacity of the battery 11 and the rated current of the switch 20.

The lighting circuit 23 of the present embodiment makes the first light source 24 and the second light source 25 to blink while keeping the input current Iin in the "allowable range X".

<<<Configuration of Lighting Circuit 23>>>

As illustrated in FIG. 1, the lighting circuit 23 includes a linear regulator 40, a switching regulator 41, switches 42 and 43, a sequential control circuit 44, disconnection detection circuits 45, 46, a turn-off circuit 47, and the terminals A to H.

The linear regulator 40 is a linear constant current circuit that generates a predetermined drive current I1 (for example, 360 mA) for driving the light emitting elements D1, D2 of the first light source 24, which are loads. Specifically, when the switch 20 is turned on and the voltage Vbat is applied to the power supply line L1, the linear regulator 40 generates the predetermined drive current I1 (for example, 360 mA) based on a power supplied from the power supply line L1. Further, when a signal S10 from the turn-off circuit 47 becomes a low level (hereinafter, "L" level), the linear regulator 40 stops the operation.

The switching regulator 41 is a switching type constant current circuit that generates a predetermined drive current I2 (for example, 360 mA) for driving the light emitting elements D3 to D15 of the second light source 25, which are loads. The switching regulator 41 is a constant current circuit that generates the drive current I2 based on power supplied from the power supply line L1 when, for example, a signal S1 of a high level (hereinafter, referred to as "H" level) is input from the sequential control circuit 44. When a signal S1*l* from the turn-off circuit 47 becomes the "L" level, the switching regulator 41 stops the operation.

Here, a "state in which the regulator stops the operation" refers to, for example, a state in which the regulator stops at least generation of the drive current (for example, a standby state). The drive current I1 corresponds to a "first drive current", and the drive current I2 corresponds to a "second drive current".

In the present embodiment, as described above, the voltage Vbat of the battery 11 is, for example, 9 to 16 V, and the voltage between the terminals D and F of the first light source 24 is 3 V or 6 V. Further, in a power transistor (not illustrated) that controls the drive current I1 and is provided in the linear regulator 40, relatively large power is consumed according to a difference between the voltage Vbat and the voltage between the terminals D and F.

Therefore, in order to generate the drive current I1 of the first light source 24, it is also possible to use a step-down switching regulator having higher power conversion efficiency than the linear regulator. However, when the step-down switching regulator is used, the current value of the input current Iin may become smaller than the above-described "predetermined value Ix". Therefore, in the present embodiment, the linear regulator 40 is used as a circuit for generating the drive current I1 of the first light source 24. The linear regulator 40 corresponds to a "first regulator", and the switching regulator 41 corresponds to a "second regulator".

The switch 42 is an element (switch element) that conducts the terminal B to which the resistance circuit 22 is connected and a ground to allow a current to flow through the resistance circuit 22. For example, when both the signal S2 from the sequential control circuit 44 and a signal S12 from the turn-off circuit 47 are at the "H" level, the switch 42 is turned on, and when either of the signals S2, S12 is at the low level (hereinafter, "L" level), the switch 42 is turned off.

The switch 43 is an element for sequentially turning on the light emitting elements D1 and D2 of the first light source 24, and is turned on when a signal S3 from the sequential control circuit 44 reaches the "H" level and is turned off when the signal S3 reaches the "L" level. Here, the switch 43 is provided between the terminals E and F such that the switch 43 and the light emitting element D2 are connected in parallel. Therefore, when the switch 43 is turned on, the drive current I1 is supplied only to the light emitting element D1 of the light emitting elements D1, D2, and when the switch 43 is turned off, the drive current I1 is supplied to both the light emitting elements D1, D2.

The sequential control circuit 44 repeatedly controls the switching regulator 41 and the switches 42, 43 at the "predetermined cycle Tx" and sequentially turns on the light emitting elements D1 to D15 based on an instruction from the microcomputer 21. Specifically, the sequential control circuit 44 outputs, to the switching regulator 41, the switch 42, and the switch 43, the signals S1 to S3 for controlling the switching regulator 41, the switch 42, and the switch 43, respectively. Operations of the sequential control circuit 44 will be described in detail later.

The disconnection detection circuit 45 detects whether there is a disconnection in the light emitting elements D1, D2 of the first light source 24 based on an output voltage of the linear regulator 40. Here, when either of the light emitting elements D1, D2 is disconnected, the resistance value between the anode and the cathode of the disconnected light emitting element increases. In such a state, when the drive current I1 is supplied to the light emitting elements D1, D2, the output voltage of the linear regulator 40 increases greatly.

For example, the disconnection detection circuit 45 of the present embodiment determines whether the output voltage of the linear regulator 40 is higher than a predetermined value V1, and detects that there is a disconnection in the first light source 24 when the output voltage becomes higher than the predetermined value V1. When the disconnection detection circuit 45 detects the disconnection, the disconnection detection circuit 45 changes a level of a line L2 that connects the disconnection detection circuits 45, 46 to the turn-off circuit 47 from the "H" level to the "L" level.

The disconnection detection circuit 46 detects whether there is a disconnection in the light emitting elements D3 to D15 of the second light source 25 based on an output voltage of the switching regulator 41. Similarly to the disconnection detection circuit 45, when the output voltage of the switching regulator 41 becomes higher than a predetermined value V2, the disconnection detection circuit 46 detects a disconnection of the second light source 25, and changes the level of the line L2 from the "H" level to the "L" level. The disconnection detection circuits 45, 46 correspond to a "first determination circuit" and a "second determination circuit", respectively, and the predetermined values V1, V2 correspond to a "first predetermined value" and a "second predetermined value", respectively.

When either of the disconnection detection circuits 45, 46 detects the disconnection, the turn-off circuit 47 stops operations of the linear regulator 40 and the switching regulator 41 in order to turn off the first light source 24 and the second light source 25. The turn-off circuit 47 turns off the switch 42 in order to prevent unnecessary power from being consumed in the resistance circuit 22 based on a disconnection detection result of either of the disconnection detection circuits 45, 46. The turn-off circuit 47 includes a capacitor 60, inverters 61, 62, and Schottky barrier diodes 63 to 65.

The capacitor 60 is an element that is charged when the switch 20 is turned on and the voltage Vbat is applied to the power supply line L1, and holds charges for operating the inverters 61, 62. The capacitor 60 is charged, for example, via a diode (not illustrated) connected to the power supply line L1. Here, assuming that a forward voltage of the diode for charging the capacitor 60 is a voltage Vf, in the present embodiment, a voltage Vdd of the capacitor 60 is smaller than the voltage Vbat by the voltage Vf.

The inverter 61 is a circuit that inverts a logic level of the line L2 and outputs the inverted logic level, and includes a PNP transistor 70, a diode 71, and a resistor 72 that are connected in series. For example, when the line L2 is at the "H" level, since the PNP transistor 70 is turned off, a node N1 to which the diode 71 and the resistor 72 are connected is in the "L" level. On the other hand, when the line L2 is at the "L" level, since the PNP transistor 70 is turned on, the node N1 becomes the "H" level.

The inverter 62 is a circuit that inverts a logic level of the node N1 and outputs the inverted logic level, and includes an NMOS transistor 80 and resistors 81, 82 that are connected in series. Here, for example, when the node N1 is at the "H" level, since the NMOS transistor 80 is turned on, a level of a node N2 to which the NMOS transistor 80 and the resistor 81 are connected becomes the "L" level. When the node N1 is at the "L" level, since the NMOS transistor 80 is turned off, the level of the node N2 becomes the "H" level.

In the present embodiment, the node N1 which is an output of the inverter 61 is connected to an gate electrode of the NMOS transistor 80, which is an input of the inverter 62. Further, a node between the resistors 81, 82 of the inverter 62 and a base electrode of the PNP transistor 70, which is an input of the inverter 61, are connected to each other via the connection line L2. Therefore, the turn-off circuit 47 operates as a holding circuit that holds the logical level of the line L2.

When the disconnection detection is performed and the turn-off circuit 47 holds the "L" level signal, the Schottky barrier diode 63 generates, at an anode thereof, the signal S10 of the "L" level for stopping the operation of the linear regulator 40.

When the disconnection detection is performed and the turn-off circuit 47 holds the "L" level signal, the Schottky barrier diode 64 generates, at an anode thereof, the signal S11 of the "L" level for stopping the operation of the switching regulator 41.

When the disconnection detection is performed and the turn-off circuit 47 holds the "L" level signal, the Schottky barrier diode 65 generates, at an anode thereof, the signal S12 of the "L" level for turning off the switch 42.

<<<Operations of Lighting Circuit 23>>>

Figure 4:
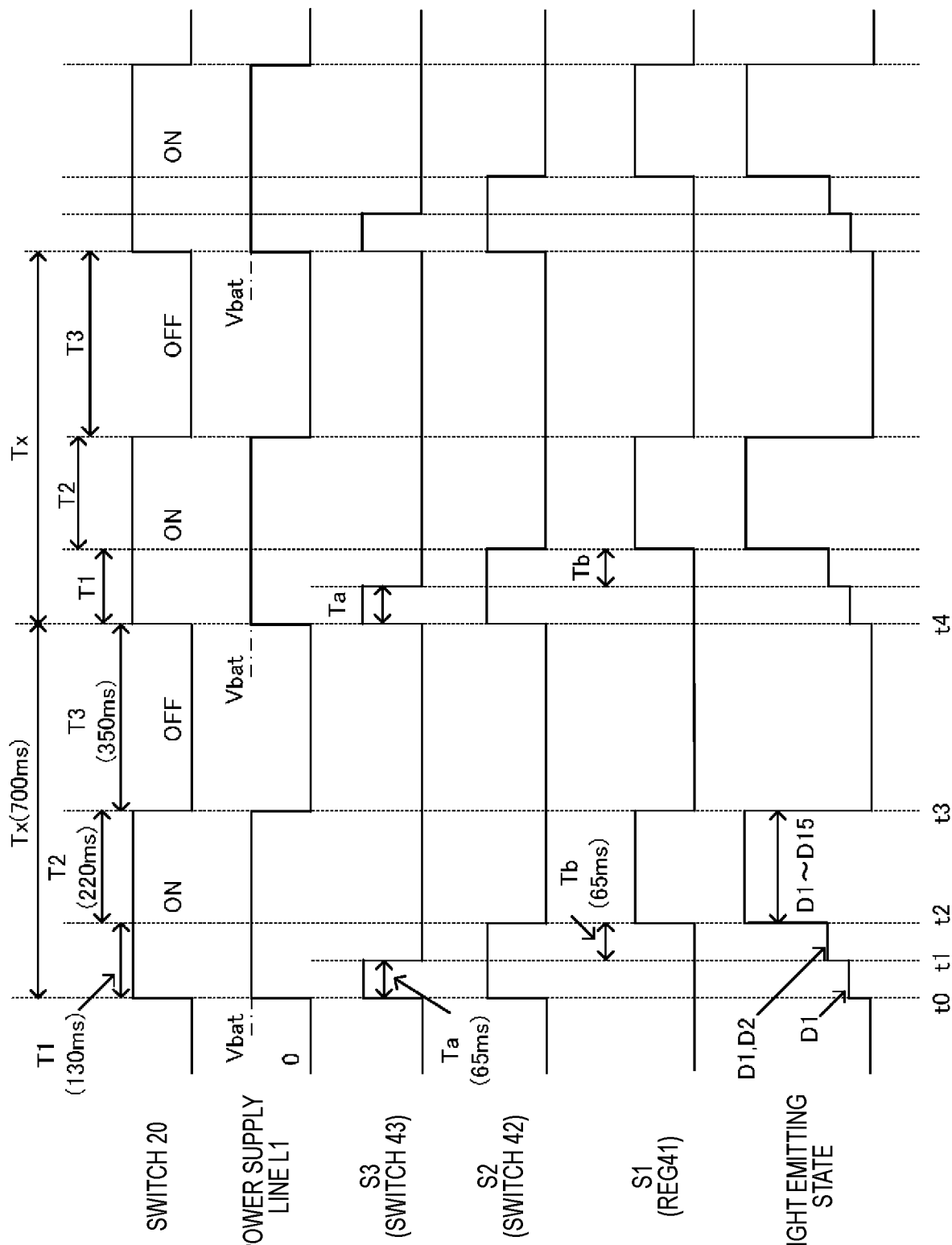
FIG. 4 is a diagram illustrating operations of the turn signal lamp.

FIG. 4 is a diagram illustrating operations of the lighting circuit 23. Here, when the direction indicator (not illustrated) for making the turn signal lamp 10 blink is operated, the microcomputer 21 of the present embodiment, for example, repeats on and off of the switch 20 at the predetermined "cycle Tx (for example, 700 ms)". It is assumed that, in the cycle Tx, each of the periods in which the switch 20 is on and off is a half period (350 ms) of the cycle Tx.

Further, while the switch 20 is on, the sequential control circuit 44 controls various circuits and elements such that the number of light emitting elements that are turned on is increased to "one", "two", and "fifteen". Hereinafter, in the present embodiment, a period in which the "one" light emitting element D1 is on is set to a "period Ta (for example, 65 ms)", and a period in which the "two" light emitting elements D1, D2 are on is set to a "period Tb (for example, 65 ms)".

Further, a period in which the first light source 24 is on is set to a "first period T1 (for example, 130 ms)", a period in which the first light source 24 is on is set to a "second period T2 (for example, 220 ms)", and a period in which the first light source 24 and the second light source 25 are off is set to a "third period T3 (for example, 350 ms)". Here, in order to prevent any of the light emitting elements D1 to D15 from being disconnected, the turn-off circuit 47 holds the signal of the "H" level.

First, at time t0, when the direction indicator (not illustrated) for making the turn signal lamp 10 blink is operated, the microcomputer 21 turns on the switch 20. As a result, since the voltage Vbat of the battery 11 is applied to the power supply line L1, the linear regulator 40 is started to generate the drive current I1.

At time t0, since the sequential control circuit 44 outputs the signal S3 of the "H" level based on an instruction from the microcomputer 21, the switch 43 is turned on. As a result, the drive current I1 is supplied only to the light emitting element D1 of the light emitting elements D1, D2 of the first light source 24, and the "one" light emitting element D1 is turned on.

Figure 5:
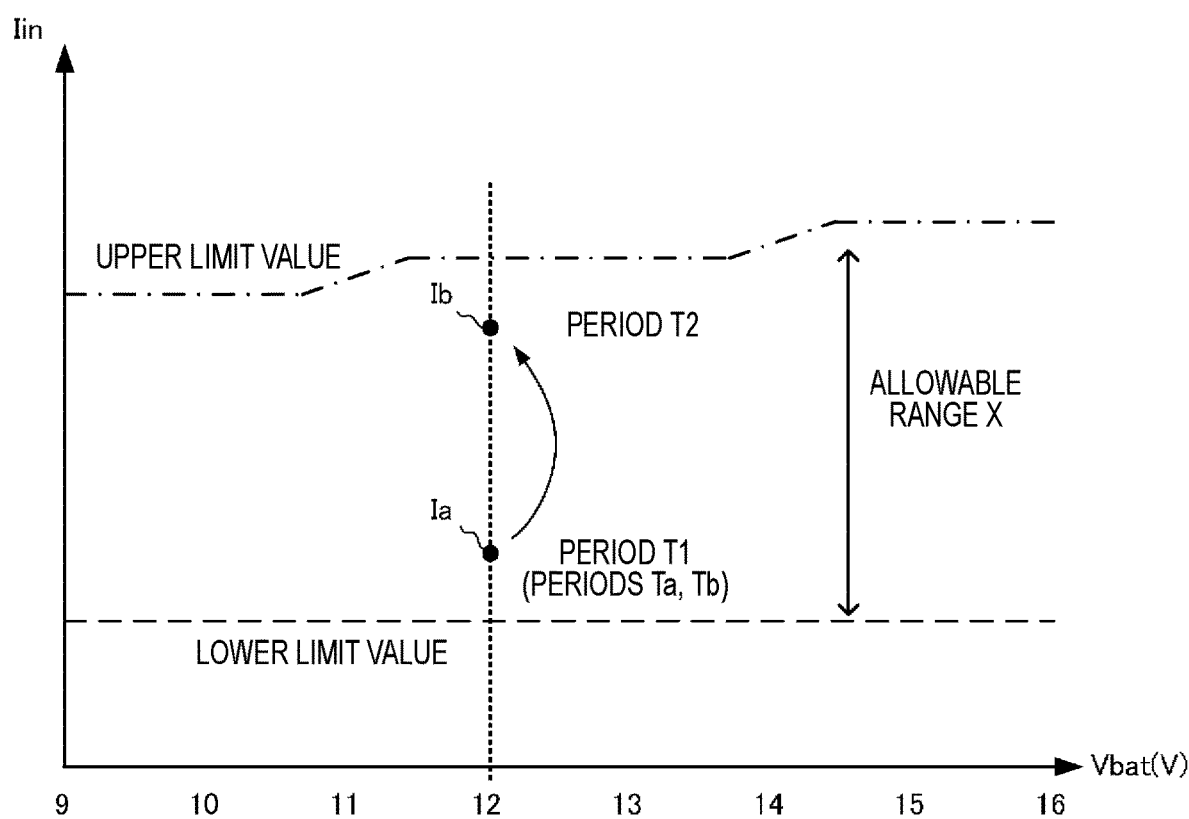
FIG. 5 is a diagram illustrating an input current during the operations of the turn signal lamp.

Further, at time t0, since the sequential control circuit 44 changes the signal S2 to the "H" level based on an instruction from the microcomputer 21, the switch 42 is turned on. As a result, the input current Iin flows to the resistance circuit 22 in addition to the linear regulator 40. Therefore, as illustrated in FIG. 5, in the present embodiment, a "current value Ia" of the input current Iin at this timing can be surely made larger than the "lower limit value".

Here, at time t0, the switch 42 is turned on and a part of the input current Iin is caused to flow through the resistance circuit 22, but the present invention is not limited thereto. Specifically, when the power consumption of the linear regulator 40 is sufficiently large, the turn signal lamp 10 does not need to include the resistance circuit 22 and the switch 42.

At time t1 when the "period Ta (for example, 65 ms)" elapses from time t0, the sequential control circuit 44 changes the signal S3 to the "L" level and turns off the switch 43. As a result, since the drive current I1 is supplied to the light emitting elements D1, D2 of the first light source 24, the "two" light emitting elements D1, D2 are turned on. In the present embodiment, power consumed by the light emitting element D2 in the "period Tb" is consumed by the linear regulator 40 in the "period Ta". Therefore, as illustrated in FIG. 5, the current value of the input current Iin in the "first period T1" is, for example, the "current value Ia".

At time t2 when the "period Tb (for example, 65 ms)" elapses from time t1, the sequential control circuit 44 changes the signal S1 to the "H" level and changes the signal S2 to the "L" level. As a result, since the switching regulator 41 is started, and the drive current I2 is supplied to the light emitting elements D3 to D15, a total of "fifteen" light emitting elements D1 to D15 are turned on. Therefore, since the power consumption of the second light source 25 increases, the input current Iin rapidly increases.

However, in the present embodiment, since the switch 42 is turned off at this timing, no current flows through the resistance circuit 22. Therefore, as illustrated in FIG. 5, although the current value of the input current Iin increases from the "current value Ia" to, for example, the "current value Ib", the "current value Ib" can be prevented from exceeding the "upper limit value".

At time t3 when the "second period T2 (for example, 220 ms)" elapses from time t2, the microcomputer 21 turns off the switch 20. As a result, since the supply of power to the turn signal lamp 10 is stopped, the operations of the linear regulator 40 and the switching regulator 41 are also stopped. Accordingly, since the supply of the drive current I1 to the light emitting elements D1, D2 and the supply of the drive current I2 to the light emitting elements D3 to D15 are also stopped, the first light source 24 and the second light source 25 are turned off.

At time t4 when the "third period T3 (for example, 350 ms)" elapses from time t3 when the first light source 24 and the second light source 25 are turned off, the microcomputer 21 turns on the switch 20 again. Therefore, the operations from time t0 to time t4 are repeated in the "cycle Tx" after time t4.

Here, it has been described that none of the light emitting elements D1 to D15 is disconnected, but for example, when any one of the light emitting elements D1 to D15 is disconnected, the turn-off circuit 47 stops the operations of the linear regulator 40 and the switching regulator 41. Therefore, in such a case, even when the voltage Vbat is applied to the power supply line L1, the lighting circuit 23 does not turn on the first light source 24 or the second light source 25. At this time, since the turn-off circuit 47 turns off the switch 42, the power consumed by the turn signal lamp 10 becomes substantially zero.

Another Embodiment

For example, the first light source 24 includes the two light emitting elements D1, D2, but the present invention is not limited thereto. For example, the first light source 24 may include three light emitting elements.

Each of the first light source 24 and the second light source 25 includes a plurality of light emitting units. Here, the "light emitting unit" is composed of at least one light emitting element. For example, when the first light source 24 includes three light emitting elements, the light source includes a light emitting unit including one light emitting element and a light emitting unit including two light emitting elements. For example, when one light emitting element is connected between the terminals D and E and two light emitting elements are connected between the terminals E and F, the lighting circuit 23 sequentially turns on "one", "three" and "sixteen" light emitting elements.

Further, in the present embodiment, all of the "thirteen" light emitting elements D3 to D15 of the second light source 25 are turned on in the "second period T2", but the present invention is not limited thereto. Specifically, similarly to the first light source 24, the lighting circuit 23 may turn on a first light emitting unit including "three" light emitting elements of the second light source 25 and then turn on a second light emitting unit including the remaining "ten" light emitting elements in the "second period T2". Such sequential lighting of the second light source 25 in the "second period T2" can be realized by, for example, providing a switch (not illustrated) connected in parallel to the second light emitting unit of the second light source 25 and turning off the sequential control circuit 44 at a predetermined timing of the "second period T2".

<<<Configuration of Turn Signal Lamp 15>>>

Figure 6:
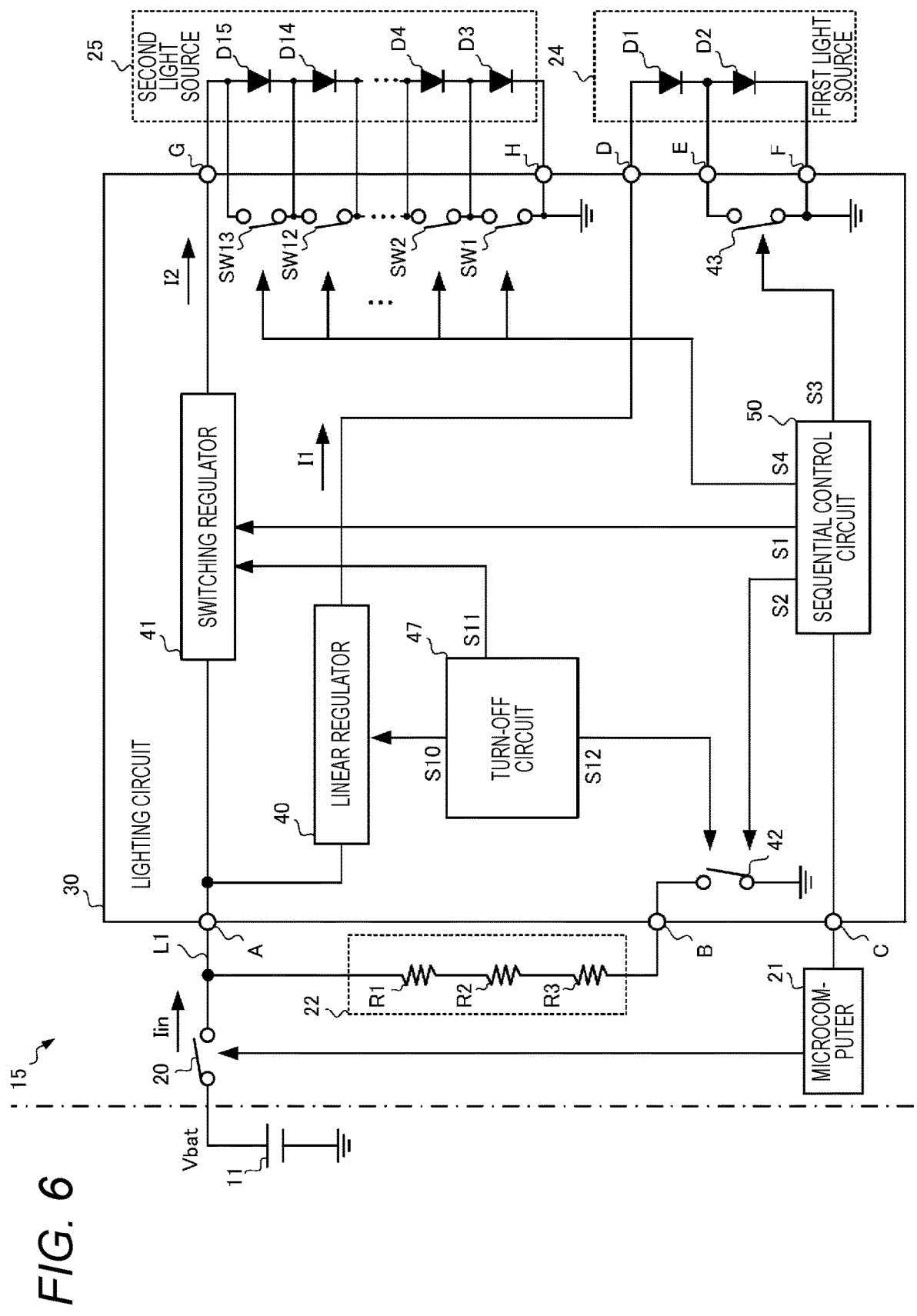
FIG. 6 is a diagram illustrating an example of the turn signal lamp.

FIG. 6 is a diagram illustrating an example of a configuration of a turn signal lamp 15 according to an embodiment of the present disclosure. The turn signal lamp 15 includes the switch 20, the microcomputer 21, the resistance circuit 22, the first light source 24, the second light source 25, and a lighting circuit 30. In FIG. 6, the same components as those in FIG. 1 are denoted by the same reference numerals.

Similarly to the lighting circuit 23 of FIG. 1, the lighting circuit 30 is a circuit that sequentially turns on the first light source 24 and the second light source 25, and includes the linear regulator 40, the switching regulator 41, the switches 42, 43, SW1 to SW13, a sequential control circuit 50, the disconnection detection circuits 45, 46 (not illustrated), the turn-off circuit 47, and the terminals A to H. Here, when the lighting circuit 30 is compared with the lighting circuit 23 of FIG. 1, configurations other than the switches SW1 to SW13 and the sequential control circuit 50 are the same. Therefore, the switches SW1 to SW13 and the sequential control circuit 50 will be mainly described below. The lighting circuit 30 includes the disconnection detection circuits 45, 46 illustrated in FIG. 1, but the disconnection detection circuits 45, 46 are omitted here for convenience.

The switches SW1 to SW13 are connected in series in order to sequentially turn on the light emitting elements D3 to D15 of the second light source 25. One end of the switch SW1 is connected to a cathode of the light emitting element D3, and the other end of the switch SW1 is connected to an anode of the light emitting element D3. Therefore, the switch SW1 is connected in parallel with the light emitting element D3. Similarly to the switch SW1, the switches SW2 to SW13 are connected in parallel to the light emitting elements D4 to D15, respectively. The switches SW1 to SW13 and the light emitting elements D3 to D15 are connected to each other via terminals (not illustrated).

Similarly to the sequential control circuit 44, the sequential control circuit 50 repeatedly controls the switching regulator 41, the switches 42, 43, and the SW1 to S13 in the "predetermined cycle Tx" based on an instruction from the microcomputer 21 to sequentially turn on the light emitting elements D1 to D15. Specifically, the sequential control circuit 44 outputs, to the switching regulator 41, the switch 42, the switch 43, and the switches SW1 to SW13, signals S1 to S4 for controlling the switching regulator 41, the switch 42, the switch 43, and the switches SW1 to SW13, respectively. Here, since the signals S1 to S3 output by the sequential control circuit 50 have already been described, the signal S4 for controlling the switches SW1 to SW13 will be described.

Figure 7:
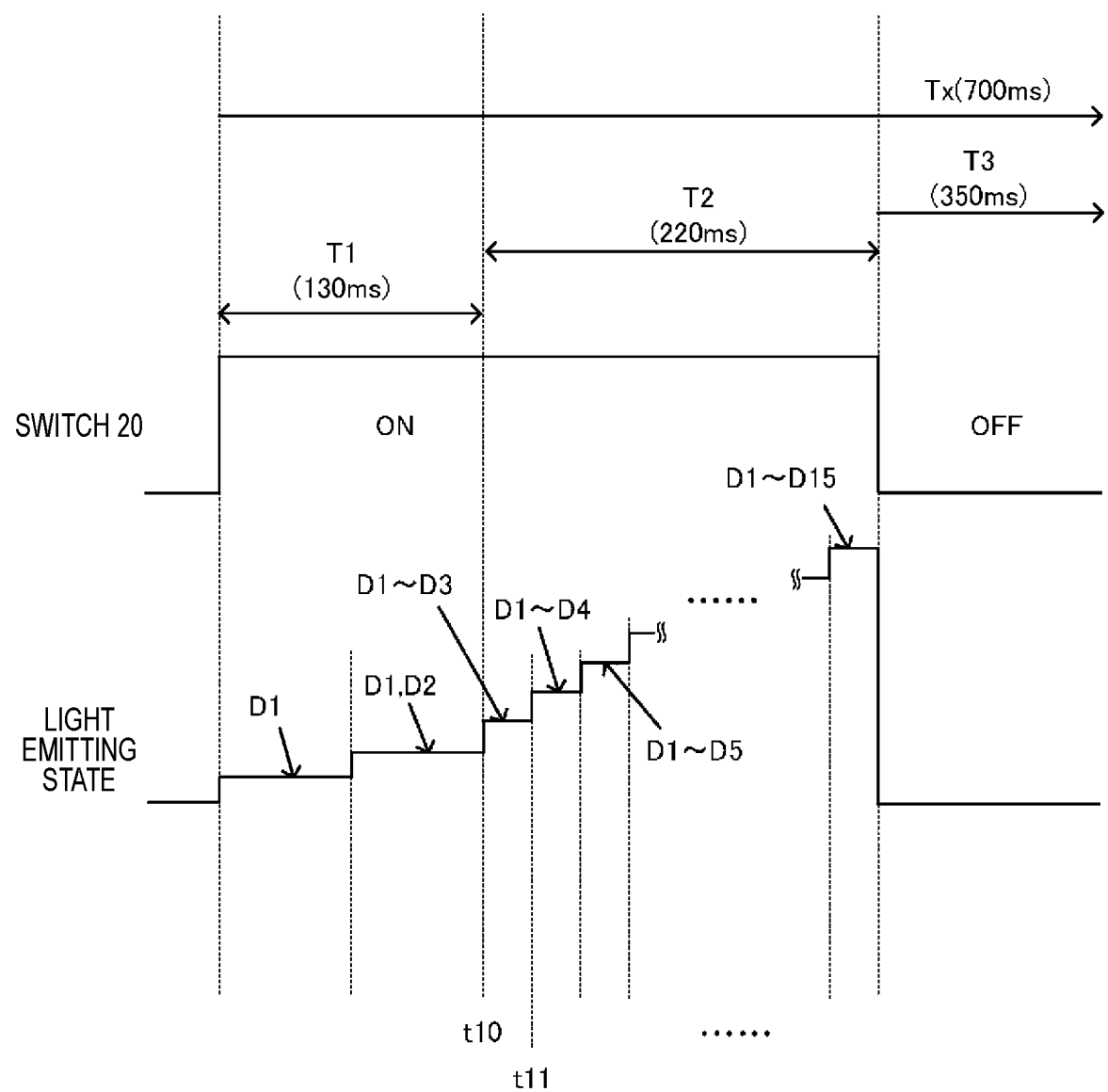
FIG. 7 is a diagram illustrating operations of the turn signal lamp.

The sequential control circuit 50 outputs the signal S4 in the "second period T2" of the "cycle Tx", and sequentially turns off the switches one by one from the switch SW1 on a ground side among the thirteen switches SW1 to SW13. Specifically, at time t10 when the "second period T2" illustrated in FIG. 7 starts, the sequential control circuit 50 turns off only the switch SW1 and turns on the other switches SW2 to SW13 among the switches SW1 to SW13. As a result, since the drive current I2 from the switching regulator 41 flows only to the light emitting element D3 among the light emitting elements D3 to D15 of the second light source 25, the three light emitting elements D1 to D3 are turned on.

At time t11, the sequential control circuit 50 turns off the switches SW1, SW2 among the switches SW1 to SW13 and turns on the other switches SW3 to SW13. As a result, since the drive current I2 flows through the light emitting elements D3, D4, the four light emitting elements D1 to D4 are turned on. Thereafter, based on the signal S4, the sequential control circuit 50 sequentially turns off the switches on the ground side, among the switches SW3 to SW13, one by one at predetermined time intervals. As a result, in the "second period T2", the number of light emitting elements that are turned on sequentially increases one by one, and finally all the light emitting elements D1 to D15 of the first light source 24 and the second light source 25 are turned on.

In this manner, the sequential control circuit 50 of the present embodiment can turn on the light emitting elements of the second light source 25 in a stepwise manner by sequentially turning off the switches one by one from the switch on the ground side among the thirteen switches SW1 to SW13. In the "second period T2", the sequential control circuit 50 turns off the switch every predetermined time interval (for example, a period=T2/12), but the present invention is not limited thereto, and the switches may be turned off sequentially at different time intervals. Here, for example, the "one" light emitting element of the second light source 25 corresponds to the "light emitting unit".

The turn signal lamp 10 of the present embodiment has been described above. Each time the voltage Vbat is applied to the power supply line L1, the linear regulator 40 generates the drive current I1 for driving the first light source 24 in the "first period T1" and the "second period T2". Further, the sequential control circuit 44 controls the switching regulator 41 in the "second period T2" of the "cycle Tx" in which the voltage Vbat is applied to the power supply line L1 to generate the drive current I2. In the present embodiment, the linear regulator 40 is used of which the power conversion efficiency is lower than that of the switching type regulator in the "first period T1" in which the number of light emitting elements that are turned on is small. Accordingly, in the "first period T1", the current value of the input current Iin can be made larger than the "lower limit value" of the "allowable range X". Accordingly, the light sources of the turn signal lamp 10 can be prevented from being erroneously detected as being disconnected.

In the "first period T1", since the switch 42 is turned on, a current flows from the power supply line L1 to the resistance circuit 22. As a result, in the present embodiment, the current value of the input current Iin can be more surely made larger than the "lower limit value".

In the "second period T2", the linear regulator 40 and the switching regulator 41 operate, and the power consumption of the turn signal lamp 10 increases. On the other hand, in the "second period T2", since the switch 42 is turned off, the supply of the current from the power supply line L1 to the resistance circuit 22 is stopped. Accordingly, the input current Iin can be prevented from exceeding the "upper limit value" and the power consumption of the turn signal lamp 10 can be suppressed.

When there is a disconnection in the first light source 24 and the second light source 25, the turn-off circuit 47 stops the operations of the linear regulator 40 and the switching regulator 41, and turns off the switch 42. Therefore, in such a case, it is possible to suppress unnecessary power consumption in the turn signal lamp 10.

Further, since the number of light emitting elements provided in the second light source 25 ("thirteen") is larger than the number of light emitting elements provided in the first light source 24 ("two"), the power consumption of the second light source 25 is larger than the power consumption of the first light source 24. In the present embodiment, the first light source 24 having a low power consumption is driven by using the linear regulator 40 having a lower power conversion efficiency (that is, larger power consumption) than the switching regulator 41 driving the second light source 25 having a large power consumption. Accordingly, the current value of the input current Iin can be easily made larger than the "lower limit value".

In the "first period T1", the sequential control circuit 44 can sequentially turn on a part of the light emitting units (the light emitting element D1) and the remaining light emitting unit (the light emitting element D2) of the first light source 24.

Further, the sequential control circuit 50 can sequentially turn on the light emitting elements one by one among the light emitting elements D3 to D15 of the second light source 25 in the "second period T2".

The embodiments described above are for facilitating understanding of the present disclosure and are not to be interpreted as limiting the present disclosure. Further, the present disclosure can be modified and improved without departing from the spirit thereof, and the present invention includes equivalents thereof.

As a part of the present disclosure, contents of Japanese Patent Application No. 2020-006662 filed on Jan. 20, 2020 and Japanese Patent Application No. 2020-114844 filed on Jul. 2, 2020 are incorporated.

The invention claimed is:

1. A lighting circuit applied to a vehicular side turn signal lamp that makes a first light source including at least one light emitting element and a second light source including at least one light emitting element blink, the lighting circuit comprising:
    a first regulator configured to generate a predetermined first drive current to the first light source based on power from a power supply line in a first period in which the first light source is turned on and the second light source is not turned on and a second period in which the first and second light sources are turned on, and stop the supply of the first drive current to the first light source in a third period in which the first and second light sources are turned off;
    a second regulator having higher power conversion efficiency than the first regulator, and configured to generate a predetermined second drive current to the second light source based on the power from the power supply line in the second period, and stop the supply of the second drive current to the second light source in the third period; and
    a control circuit configured to repeatedly control the second regulator in a predetermined cycle including the first to third periods.

2. The lighting circuit according to claim 1 further comprising:
    a switch element configured to cause a current from the power supply line to flow to a resistor in at least the first period of the first and second periods.

3. The lighting circuit according to claim 2,
    wherein the switch element is configured to stop supply of the current from the power supply line to the resistor in the second period.

4. The lighting circuit according to claim 1 further comprising:
    a first determination circuit configured to determine whether an output voltage of the first regulator is higher than a first predetermined value;
    a second determination circuit configured to determine whether an output voltage of the second regulator is higher than a second predetermined value; and
    a turn-off circuit configured to stop operations of the first and second regulators when the output voltage of the first regulator is higher than the first predetermined value or when the output voltage of the second regulator is higher than the second predetermined value.

5. The lighting circuit according to claim 1,
    wherein power consumption of the second light source is larger than power consumption of the first light source.

6. The lighting circuit according to claim 1,
    wherein the first light source includes a plurality of light emitting units, and
    wherein the control circuit is configured to sequentially turn on the plurality of light emitting units during the first period.

7. The lighting circuit according to claim 1,
    wherein the second light source includes a plurality of light emitting units, and
    wherein the control circuit is configured to sequentially turn on the plurality of light emitting units during the second period.

8. The lighting circuit according to claim 1,
    wherein the first regulator is a linear regulator, and
    wherein the second regulator is a switching regulator.

9. A vehicular side turn signal lamp comprising:
    a first light source including at least one light emitting element;
    a second light source including at least one light emitting element; and
    a lighting circuit configured to make the first light source and the second light source blink,
    wherein the lighting circuit includes
        a first regulator configured to generate a predetermined first drive current to the first light source based on power from a power supply line in a first period in which the first light source is turned on and the second light source is not turned on and a second period in which the first and second light sources are turned on, and stop the supply of the first drive current to the first light source in a third period in which the first and second light sources are turned off, a second regulator having higher power conversion efficiency than the first regulator, and configured to generate a predetermined second drive current to the second light source based on the power from the power supply line in the second period, and stop the supply of the second drive current to the second light source in the third period, and a control circuit configured to repeatedly control the second regulator in a predetermined cycle including the first to third periods.

10. A lighting circuit applied to a vehicular side turn signal lamp that makes a first light source including at least one light emitting element and a second light source including at least one light emitting element blink, the lighting circuit comprising:

a first regulator configured to supply a predetermined first drive current to the first light source based on power from a power supply line in a first period in which the first light source is turned on and the second light source is not turned on and a second period in which the first and second light sources are turned on, and stop the supply of the first drive current to the first light source in a third period in which the first and second light sources are turned off;

a second regulator having higher power conversion efficiency than the first regulator, and configured to supply a predetermined second drive current to the second light source based on the power from the power supply line in the second period, and stop the supply of the second drive current to the second light source in the third period;

a control circuit configured to repeatedly control the second regulator in a predetermined cycle including the first to third periods;

a first determination circuit configured to determine whether an output voltage of the first regulator is higher than a first predetermined value;

a second determination circuit configured to determine whether an output voltage of the second regulator is higher than a second predetermined value; and a turn-off circuit configured to stop operations of the first and second regulators when the output voltage of the first regulator is higher than the first predetermined value or when the output voltage of the second regulator is higher than the second predetermined value.

* * * * *